(12) United States Patent
Al-Nasri et al.

(10) Patent No.: US 11,761,545 B2
(45) Date of Patent: Sep. 19, 2023

(54) GASKETED SPECTACLE PLATE ASSEMBLY FOR INDUSTRIAL PIPE SYSTEMS

(71) Applicant: Saudi Arabian Oil Company, Dhahran (SA)

(72) Inventors: Nadhir I. Al-Nasri, Al-Qatif (SA); Senhat M. Al-Otaibi, Dammam (SA); Mohammed S. Al-Khoufi, Al-Hufuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 82 days.

(21) Appl. No.: 17/519,114

(22) Filed: Nov. 4, 2021

(65) Prior Publication Data

US 2023/0134761 A1    May 4, 2023

(51) Int. Cl.
*F16K 3/06*      (2006.01)
*F16K 3/314*    (2006.01)
*F16K 3/02*      (2006.01)

(52) U.S. Cl.
CPC .............. *F16K 3/06* (2013.01); *F16K 3/0227* (2013.01); *F16K 3/0281* (2013.01); *F16K 3/314* (2013.01)

(58) Field of Classification Search
CPC ........ F16K 3/60; F16K 3/0227; F16K 3/0281; F16K 3/314; F16K 3/312; F16L 29/007; F16L 55/1018
See application file for complete search history.

(56) References Cited

U.S. PATENT DOCUMENTS

| | | | | |
|---|---|---|---|---|
| 2,242,467 A | * | 5/1941 | Hamer | F16K 3/312 138/44 |
| 3,342,217 A | * | 9/1967 | Low | F16K 3/312 251/327 |
| 3,351,099 A | * | 11/1967 | Shindler | F16K 3/312 74/88 |
| 5,180,294 A | * | 1/1993 | Watchorn | F04B 7/0096 417/900 |
| 5,786,028 A | * | 7/1998 | Cantwell | B05B 12/24 118/301 |
| 9,987,577 B2 | | 6/2018 | Yoder et al. | |
| 2002/0185174 A1 | * | 12/2002 | Dolan | F16K 17/406 137/68.11 |
| 2017/0030470 A1 | * | 2/2017 | Al-Amri | F16K 3/06 |

* cited by examiner

*Primary Examiner* — Kelsey E Cary

(74) *Attorney, Agent, or Firm* — Leason Ellis LLP

(57) ABSTRACT

A spectacle plate assembly and method for its production includes adhesively bonding a ring-shaped flexible sealing gasket to cover all, or substantially all of a contoured gasket receiving surface that is formed on both sides of the circular plate, the upper surfaces of the contoured gasket receiving surface lying above the plane of the surface of the adjacent plate to provide a unitary structure in preparation for positioning the plate between the opposing faces of a pair of stationary flanges.

14 Claims, 4 Drawing Sheets

GASKETED SPECTACLE PLATE ASSEMBLY FOR INDUSTRIAL PIPE SYSTEMS

FIELD OF THE INVENTION

This disclosure relates to spectacle plates that are permanently installed between flanges of stationary industrial piping systems for the purpose of temporarily interrupting the flow of fluids through the pipes, i.e., for the purpose of routine maintenance of downstream equipment, and the like.

BACKGROUND OF THE INVENTION

A spectacle plate or spectacle blind is comprised of a pair of circular plates that are integrally joined at their periphery by a relatively narrow tie bar that is provided with a central opening dimensioned to pass a threaded flange bolt that is used to maintain the unit between a pair of adjacent pipe flanges. This specialized pipe fitting is so named because of its resemblance to a pair of spectacles/eye glasses where the linking tie bar resembles the nose piece.

One end of the spectacle blind is a solid plate and the other circular element is in the form of a ring having an inside diameter equal to that of the openings in flanges between which it is mounted. The device is typically mounted by positioning the tie bar between the upper section of the adjoining flanges and passing a threaded bolt through the central opening and securing the opposite end of the bolt with a threaded nut. When so positioned, the bolt serves as an axle.

After this preliminary installation step, the spectacle plate can be rotated around the central portion of the bolt to position either the solid, or blind plate in position between the faces of the flange, or to rotate the circular ring into position so that it is aligned with the openings in the opposing flange faces. If the solid plate is positioned between the flanges, then a liquid or gas in the pipeline is prevented from flowing through the fitting; positioning the ring plate between the flanges allows the product to flow. The outside diameter of the circular plates is predetermined to permit the passage of the flange bolts around the perimeter of the circular plate in its installed position between the flanges. In order to assure a fluid-tight seal, gaskets must be installed on both faces of the circular plate to contact the flanges when they are brought into close-fitting relation making contact with the spectacle blind. It will be understood that the spacing between the spectacle blind plate and the opposing flange faces requires relatively close tolerances, and that the installation of the two gaskets can present a significant challenge to the installers who must avoid damaging the gaskets, while at the same time assuring their proper positioning to secure an effective seal when the flanges are securely joined by tightening the nuts on the threaded bolts positioned around the facing flanges.

In accordance with the prior art methods, circular ring gaskets must be aligned on both sides of the spectacle plate that is to be positioned between the opposing flange faces so that the gasket does not interfere with the flange bolts as they are passed through the corresponding openings in the flange faces, and their respective nuts are tightened to secure the plate in position.

The size of the spectacle plate is determined by the characteristics of the flanges to which it will be fitted and accordingly range widely in diameter. The corresponding weights for such spectacle plates can range from 2 lbs for a class #150, size ½ inch up to 4409 lbs for a 60" pipe of the same class. The plates must be maneuvered into position and adjusted using overhead cranes and other appropriate mechanical devices that are manually controlled by the maintenance crews.

A typical spectacle plate assembly of the prior art is schematically illustrated in FIGS. 1A and 1B. As shown there, the spectacle plate (10) consists of a solid blind or spacer plate (12) and an open ring plate (14) that are joined by a tie bar (16) having a central opening (18) dimensioned to receive a threaded flange bolt. A pair of stationary opposing flanges (20a, 20b) are joined by a plurality of threaded bolts (22) secured by nuts (24). As illustrated, a total of six bolts are specified for a relatively small diameter piping system, It will be understood by those familiar with the art that such flanges can require up to 20 or even more such fasteners for large diameter fluid flanges, e.g., for a gas processing installation, to assure a tight seal.

As best shown in FIG. 1A in accordance with the prior art practice, a flat gasket (30a, 30b) having a diameter less than the corresponding bolt openings in the opposing flanges is positioned opposite the exterior surface of each of the flanges. A typical assembly procedure is as follows:

1. install the stud bolts at the 4 and 8 o'clock positions of the flange to support both the gaskets and the spectacle plate;
2. install a new gasket (30a) on one side of the spectacle plate;
3. install a second gasket (30b) on the opposite side of the spectacle plate;
4. install the remainder of the bolts; and
5. apply the requisite torque load per the sequence prescribed by the bolt tightening procedure.

The installation of the gaskets is typically considered to be a challenging task by the maintenance crew because it requires great care and benefits from experience. After installing the first gasket, it is then necessary to maneuver the spectacle plate to provide space for installation of the second gasket. This procedure is also considered a major challenge since if it is not conducted properly one or both of the gaskets can be damaged and result in leakage at the flange. This is particularly costly and wasteful when the damage is to the commonly used semi-metal gaskets. Thus, the prior art sealing method as described above, requires that the two gaskets be separately installed between the spectacle plate and flange surfaces.

The difficulties encountered with a typical installation method of the prior art as described above are directly attributable to the need to precisely position multiple components, i.e., the two gaskets and the spectacle plate during their installation between the stationary flanges.

BRIEF DESCRIPTION OF THE INVENTION

The above difficulties are overcome and significant advantages are obtained by integrating the seal with the spectacle plate in accordance with the improved method and system of the present disclosure in which a relatively thin, generally flexible sealing gasket is provided that corresponds in diameter and width to a novel finished receiving surface that is created on the otherwise smooth surfaces of the respective plates, and which will be described in detail below. The sealing gasket is bonded to the receiving surface on each side of the plate before the plate is moved into position between the opposing flange surfaces.

Each circular sealing gasket is positioned in-board from the outer periphery of the plate and is held in position by an adhesive that can be applied in the field at the time that the plate is to be moved into position. The sealing gasket material is selected to meet the prescribed specifications for the flange and the operating conditions of pressure and temperature and the fluid in the piping system.

In the practice of the present method, the spectacle plate is provided with separate sealing gaskets that are adhesively bonded to the plate's novel grooved gasket receiving surfaces to provide a unitary or integrated assembly. The flexible sealing gaskets can thus be assembled to the plate before installation and rotated into position as parts of a single integrated structure. This construction eliminates the need to place the gaskets into position between the spectacle plate and the closely-fitting flange faces.

A concentric circular portion of both sides of each of the plates (12, 14) which will be referred to herein as the "contoured gasket receiving surface" or simply the "receiving surface, is raised above the adjacent surface of the untreated plate. The upper surface of the grooves, or other contour features, lie in a plane above the plane of adjacent plate. In a preferred embodiment, the bottom of the grooves or lowermost contoured regions formed in the receiving surface lie in the plane of the surface of the plate.

In an embodiment, the receiving surface is provided with a surface finish (50) in accordance with ASME standards 16.20 Fig. GM-2.1-1, which is incorporated herein by reference. This surface treatment is specified as a grooved surface for metal gaskets used with designated systems and operating characteristics. Other contours can be employed. In accordance with the present disclosure, the grooves are created in the surfaces of the plates by appropriate tooling. The concentric rings are positioned proximate the periphery of the plate and the finished surface is prepared in accordance with the above ASME prescribed standards. This aspect of the disclosure will be described in more detail below in connection with the mounting of the flexible sealing gaskets.

The width of the receiving surface finish corresponds approximately to the width of the opposing flange gasket seating area between the central opening of the flange and extending outwardly to approximately the diameter of a circle defined by the edges of the bolt openings adjacent to the outer perimeter of the flanges. The width and position of the receiving surface is the same on both the blind or solid plate and the ring plate.

The sealing gasket can be attached to the plate surface using spray adhesive. When rotated into its final position and secured by the mounting bolts, the sealing gasket serves to mask the gasket receiving surface and potential paths for fluid leaks, and to improve the overall fluid-tightness of the pipe joint. The structure of the present disclosure comprises a separate layer or laminate in the form of a relatively thin and flexible sealing gasket (as compared to the gaskets of the prior art) selected from appropriate materials as described below that is bonded to the opposing surfaces of the plate to form the assembly.

The ability to have each of the flexible sealing gaskets integrated with the opposing faces of the blind and/or ring plates of the spectacle plate results in significant savings of time during installation, and reduces the risk of damage and economic loss associated with failed gaskets. The improved sealing gasket assembly and retaining system employing a sealing gasket as described also reduces the risk of environmental damage caused by joint leaks, and improves the overall safety for personnel performing installation and/or maintenance duties using welding torches and other open flame devices that could ignite hydrocarbon fumes escaping via leaks in the flange fittings.

BRIEF DESCRIPTION OF THE DRAWINGS

The improved method and system of the present disclosure will be described in further detail below and with reference to the attached drawings in which the same reference numerals are used to describe the same or similar elements.

DETAILED DESCRIPTION OF PREFERRED EMBODIMENTS

Figure 1A:
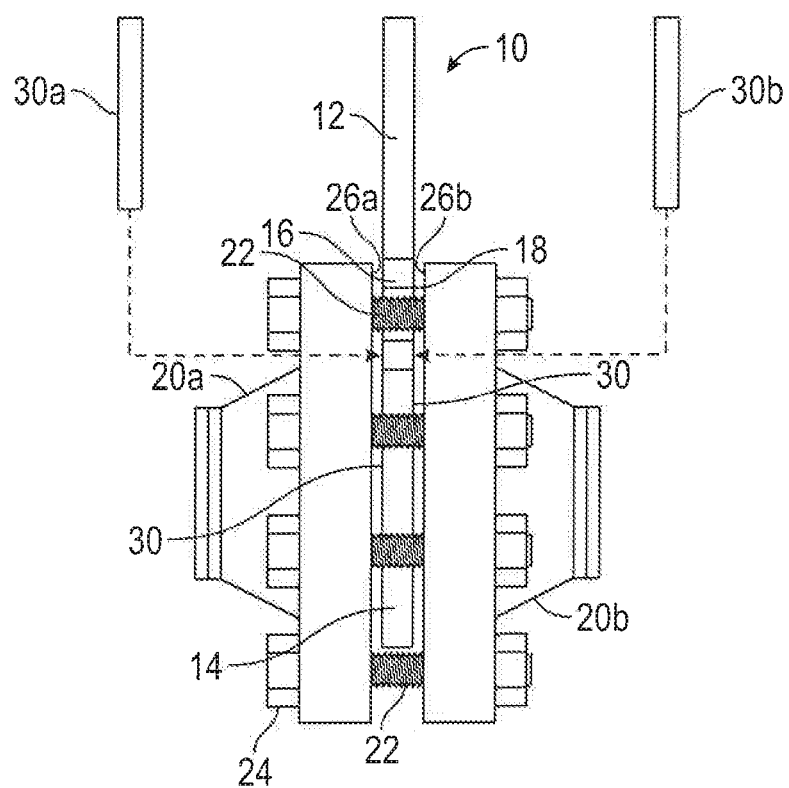
FIGS. 1A and 1B are, respectively, side elevation and cut-away views illustrative of a typical spectacle blind and flange assembly of the prior art.
Figure 1B:
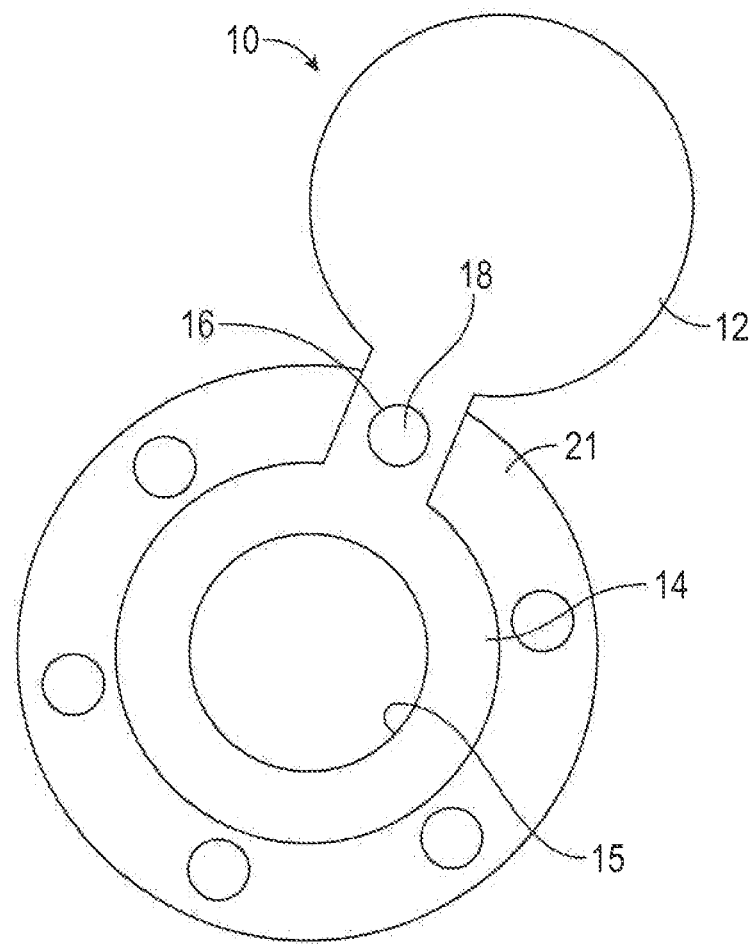
Figure 2:
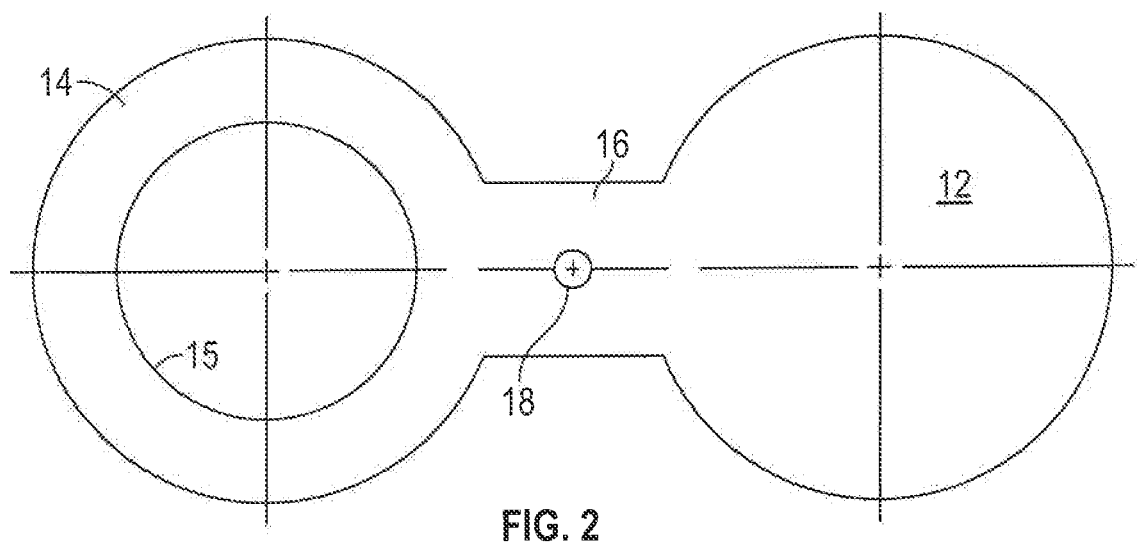
FIG. 2 is a top plan view of a typical spectacle plate of the prior art.

As will be understood from the above description of FIG. 1A of the prior art that illustrates a typical installation of a blind spectacle plate between stationary opposed flanges, in order to rotate the specialized pipe fitting around the opening (18) in the tie bar (16) that joins the blind and ring plates (12, 14), it is necessary to loosen the securing nut (24) on its bolt (22), and to remove all of the other bolts from their positions extending between the flange faces (26a, 26b).

Figure 3:
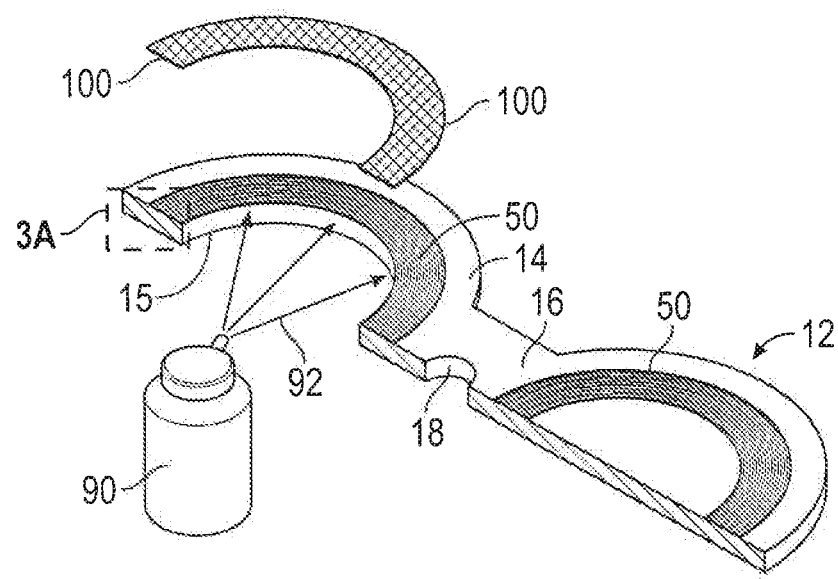
FIG. 3 is a top front perspective cross-sectional exploded view of a spectacle plate illustrating installation of sealing gasket of the present disclosure.
Figure 3A:
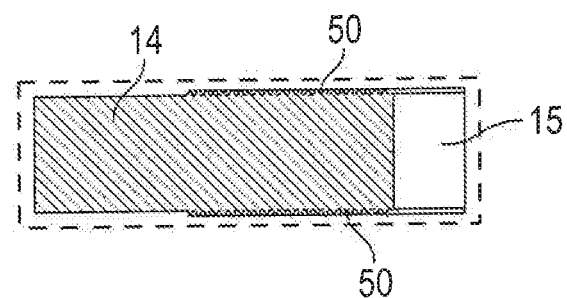
FIG. 3A is a detailed cross-sectional end view of the left end of the plate shown in FIG. 3.
Figure 4:
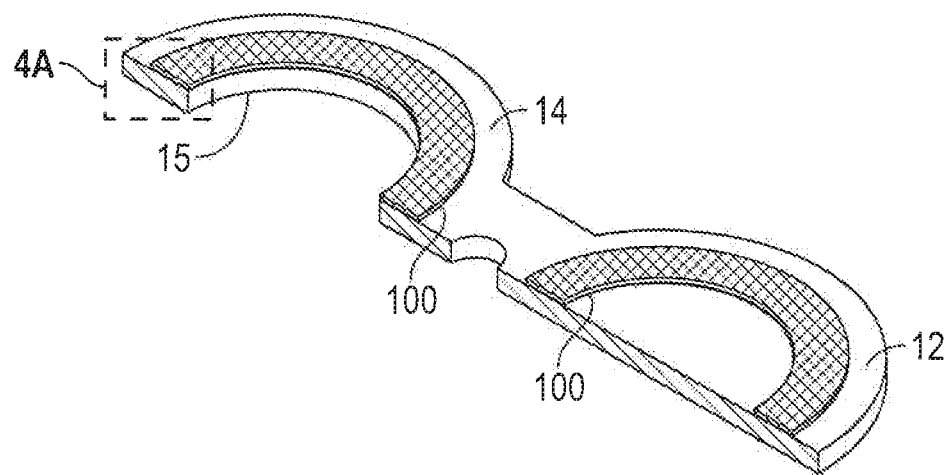
FIG. 4 is a cross-sectional view of a spectacle plate similar to FIG. 3 showing the sealing gasket on the upper surface of the plate.
Figure 4A:
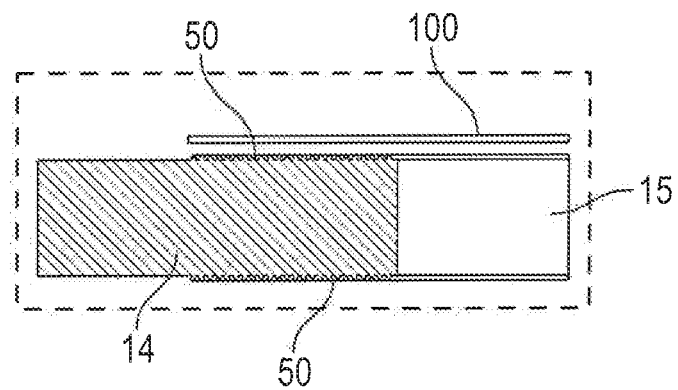
FIG. 4A is an exploded detailed end view similar to FIG. 3A with the sealing gasket above the finished surface of the plate.

Referring now to FIG. 3, a sealing gasket (100) of the present disclosure is bonded to the upper contoured gasket receiving surfaces (50) of the ring plate (14). As best shown in FIGS. 3B and 4B, it will be seen that a plane defined by the top or high points of the contoured gasket receiving surface (50) lies above the plane of the surface of the surrounding plate (14). In an embodiment, the bottom of the grooves or lowermost contoured regions formed in the receiving surface lie in the plane of the surface of the plate.

In a preferred embodiment, the sealing gasket (100) is secured in place by spray adhesive (92) that is applied to the receiving surface (50) by an appropriate applicator (90) in an amount that is sufficient to maintain the gasket securely in position, without significantly modifying the contours of the receiving surface.

Suitable adhesives include multi-purpose commercial and industrial adhesives preferably applied in the form of a spray. The adhesive can most conveniently be applied to the grooved receiving surface of the plate in a viscosity that will avoid excessive flow, particularly when the plate is in the vertical position in the field. Some overspray beyond the perimeters of the grooved surface can be tolerated.

The specific adhesive material applied is selected with a view to eventually removing the adhesive when the gasket is to be replaced. For this reason, adhesives that are epoxy-based which form a very strong bond with the surface of the metal plate are less desirable. As is the practice in the prior art, when a new gasket is to be applied, the grooved surface must be prepared to provide a clean and uniform surface, typically by means of wire brushes and the like which will not damage the contours of the surface being prepared. Chemical solvents may also be used, depending upon the nature of the material to be removed.

The surface of the plate lying outside of the grooved surface to which the adhesive material is to be applied can be treated with an appropriate masking composition to prevent the adhesive spray from making direct contact with the adjacent metal surfaces. The masking material is applied prior to the application of the spray adhesive by placing an impermeable barrier over the receiving surface that can easily be removed after application of the adhesive. The mask can be a polymer that is easily stripped from the metal surface of the plate.

The viscosity of the liquid adhesive should be such that will be subject to minimal flow from the point of application so that the receiving surface can be uniformly coated with a sufficient amount of the adhesive to secure the sealing gasket (100) in place after it has been positioned. Thus, the bonding agent should have sufficient tack to maintain the sealing gaskets in position on both sides of the spectacle plate when it is rotated into position between the faces of the flanges. The selection of adhesives having the required properties as described above is within the skill of the art.

From the above description, it will be understood that the characteristics of the sealing gasket include a tensile strength value sufficient to resist damage and/or deformation when cut from a sheet or a web to form the ring, or sections of a ring that correspond to the receiving surfaces of the plate, and also during its manual installation in the field when the plate is in a vertical position. In this regard, it is to be understood that the sealing gasket can alternatively be applied incrementally in smaller arcuate sections to cover the plate's receiving surfaces, rather than as a complete one-piece ring.

Other properties of the material from which the sealing gasket is derived include resistance to chemicals that are present in the fluid(s) in the pipeline and in the facility where the gaskets will be used, as well as compatibility with the adhesive(s) that will be applied. The adhesive material should be fire resistant and preferably not flammable; and it should not be adversely affected by temperatures to which the material will be exposed during use.

It has been found that suitable commercially available materials for fabricating the sealing gasket (100) include graphite and polytetrafluorethylene (PTFE) in sheet form ranging in thickness from 0.4 mm to 0.7 mm. A preferred thickness of the flexible sealing gasket material is 0.5 mm.

In most installations, the ring plate will be in position to permit the continuous flow of fluid through the piping system and the opposite blind plate will typically be exposed to the elements for relatively long periods of time. Under such operating conditions, it will be understood that the sealing gaskets of the present disclosure will be installed at such time as preparations are made for the changing of the position of the spectacle blind plate fitting to seal the flanges against fluid flow. Routine cleaning of the respective grooved receiving surfaces in the plates will be performed as necessary to restore the surfaces (50) before the sealing gaskets (100) are bonded in place.

If the spectacle plate has been stored at a location in a protected environment, e.g., inside of a building, the seals can be installed on the spectacle plate receiving surface when the plates are fabricated, or during their storage prior to installation, or in a maintenance facility in close proximity to the time and place of their installation.

The same or different types of adhesive can be applied to the spectacle plates if the sealing gaskets are to be assembled prior to storage for a significant period of time. For example, a different adhesive composition may be preferable for securing the sealing gasket to the plate in the field.

In a further embodiment, the sealing gasket can be produced in a range of sizes to meet the known ASME specifications of a number of spectacle plates of varying diameter. Costs can be minimized by cutting a series of circular seals of decreasing diameters from a single, large sheet of the gasket material.

The sealing gasket can also be pre-coated on one side with an adhesive material to which is applied a manually removable protective release layer of, e.g., coated paper, a polymeric film, or the like to form a robust laminate that can be packaged and shipped for later use in the field or in a protected facility as described above. The protective release layer can be marked or otherwise provided with indicia to facilitate their correct positioning on the grooved receiving surfaces. They will be manually removed at the time of installation on the plate.

From the above, it will be understood that a method is provided for constructing a spectacle plate assembly that includes a spectacle plate formed from a first circular solid or blind plate joined to a circular ring plate by a tie bar, where the opposing sides of each of the circular plates includes a grooved concentric contoured gasket receiving surface, the upper surface of the grooves lying in a plane above the plane of the surrounding plate and extending inwardly a predetermined distance from a position proximate the peripheral edge of the plate toward the center of the plate, the contoured gasket receiving surface being configured and dimensioned to receive a sealing gasket that, in use, is positioned between opposing faces of stationary pipe flanges, where the method includes the following steps:

a. providing a sealing gasket in the form of a ring that is dimensioned and configured to cover all, or substantial all of the grooved receiving surface;

b. applying an adhesive composition to a side of the sealing gasket;

c. providing the adhesive on the sealing gasket with a manually removable protective release cover to isolate the adhesive composition, to thereby provide an adhesive-coated ring-shaped sealing gasket with a protective release cover that can be stored and transported for later use;

d. providing a pair of ring-shaped sealing gaskets prepared in accordance with steps (a)-(c) for use with a spectacle plate secured between a pair of flanges;

e. manually removing the release cover from the adhesive on one of the ring-shaped sealing gaskets and affixing and securely bonding it to the grooved receiving surface on one side of a spectacle plate; and f. repeating step (e) on the opposite side of the spectacle plate to thereby provide a unitary spectacle plate assembly with integrated sealing gaskets for placement between the opposing flange faces.

Practice of this method will further reduce the time required to complete the assembly in situ, i.e., in the field at the precise location of the pipe flanges where the spectacle plate is installed. The use of film seals that are precoated with the appropriate adhesive and release layers will minimize the risk and damage to gaskets and contribute to ease of installation.

As will be seen from the above detailed description, the present method and system provides the advantages of reducing the time for changeover and installation of the spectacle plate, assures a secure and fluid-tight seal, and avoids the risk of loss and/or damage to the gasket.

While the novel sealing gasket of this disclosure and its method of manufacture and use with spectacle plates have been described in detail above, other modifications and adaptations rill be apparent to those of ordinary skill in the art, and the scope of protection for the invention is to be determined by the claims that follow.

The invention claimed is:

1. A spectacle plate assembly comprising:
   a. a spectacle plate formed from a first circular solid or blind plate joined to a circular ring plate by a tie bar, where opposing sides of each of the circular plates includes a grooved concentric contoured gasket receiving surface, wherein upper surfaces of the grooved concentric contoured gasket receiving surface lie in a plane above a plane of a surrounding plate, and extending inwardly from a position proximate a peripheral edge of the plate a predetermined distance toward a center of the plate, the contoured gasket receiving surface being configured and dimensioned to receive a flexible sealing gasket that is positioned between opposing faces of stationary pipe flanges;
   b. an adhesive composition applied to the contoured gasket receiving surfaces of each plate;
   c. the flexible sealing gasket configured and dimensioned to cover all, or substantially all of the respective contoured gasket receiving surfaces of the circular plates, the flexible sealing gasket being securely bonded to the contoured gasket receiving surfaces of each plate,
   thereby providing the spectacle plate assembly that comprises the solid or blind plate and/or the ring plate having adhesively bonded and secured to the respective opposing contoured gasket receiving surfaces the flexible sealing gasket that remains in place on the plate when the plates and gaskets are in a vertical or a horizontal orientation.

2. The spectacle plate assembly of claim 1 in which the contoured gasket receiving surface is grooved and lies above the plane of the surface of the adjacent plate.

3. The spectacle plate assembly of claim 1 in which the flexible sealing gasket is in the form of a unitary ring.

4. The spectacle plate assembly of claim 1 in which the flexible sealing gasket is formed from a plurality of arcuate sections corresponding to the contoured gasket receiving surface.

5. The spectacle plate assembly of claim 1 in which bonding of the flexible sealing gasket with the adhesive composition resists displacement by a lateral force applied to an edge of the sealing gasket.

6. The spectacle plate assembly of claim 1 in which the flexible sealing gasket is graphite or polytetrafluorethylene (PTFE).

7. The spectacle plate assembly of claim 1 in which a thickness of the flexible sealing gasket is in the range of 0.4 mm to 0.7 mm.

8. The spectacle plate assembly of claim 1 in which the flexible sealing gasket is 0.5 mm thick.

9. A method of constructing a spectacle plate assembly that includes a spectacle plate formed from a first circular solid or blind plate joined to a circular ring plate by a tie bar, where opposing sides of each of the circular plates includes a concentric contoured grooved gasket receiving surface extending inwardly a predetermined distance from a position proximate a peripheral edge of the plate toward a center of the plate, respective upper surfaces of the contoured gasket receiving surface lying in a plane above a plane of a surrounding plate, the contoured gasket receiving surface being configured and dimensioned to receive a flexible sealing gasket that is positioned between opposing faces of stationary pipe flanges, the method comprising:
   a. applying an adhesive composition to the contoured receiving surfaces of one or both of the circular plates;
   b. providing a pair of flexible sealing gaskets, each in the form of a ring that is dimensioned and configured to cover all, or substantially all of the contoured gasket receiving surface;
   c. contacting surfaces of the flexible sealing gaskets with the adhesive composition applied to each of the contoured gasket receiving surfaces to securely bond the flexible sealing gasket to the plate and thereby form the spectacle plate assembly that can be positioned vertically between the opposing faces of stationary pipe flanges.

10. The method of claim 9 in which the adhesive composition is applied in the form of a spray.

11. The method of claim 9 which includes first applying a releasable masking composition to the surfaces of the plate adjacent the contoured gasket receiving surfaces to prevent the adhesive composition from contacting the adjacent surfaces.

12. The method of claim 11, where the masking composition is released by application of a solvent or by mechanical peeling of the masking composition from the surface of the plate.

13. The method of claim 9 in which each of the flexible sealing gaskets are bonded to one of the circular plates, in situ, while the plate is retained by the tie bar between the opposing surfaces of the stationary pipe flanges.

14. The method of claim 9 in which the adhesive composition is applied with a manual applicator.

* * * * *